May 25, 1926. Re. 16,355

C. R. JAMISON

FRYING BASKET

Original Filed August 18, 1925

INVENTOR

Charles R. Jamison

Frear and Bond

ATTORNEYS

Re. 16,355

Reissued May 25, 1926.

UNITED STATES PATENT OFFICE.

CHARLES R. JAMISON, OF CANTON, OHIO, ASSIGNOR TO THE ENTERPRISE ALUMINUM COMPANY, OF MASSILLON, OHIO, A CORPORATION OF OHIO.

FRYING BASKET.

Original No. 1,569,544, dated January 12, 1926, Serial No. 50,963, filed August 18, 1925. Application for reissue filed February 10, 1926. Serial No. 87,443.

This invention relates to cooking utensils, and more particularly to a perforate basket adapted to be employed with a stew pan in cooking foods in deep fat, such as French fried potatoes, oysters, doughnuts and the like; and the object of the invention is to provide an open-work basket adapted to fit within a stew pan, and having a handle arranged to be located coextensive with the handle of the stew pan, in order that the two handles may be grasped together when the basket is in the stew pan, the handle of the basket having a down-turned end portion adapted to rest upon the handle of the stew pan, and feet being provided upon the basket for engagement with the rim lip of the stew pan in order that the basket may be supported out of the fat to permit the food to be drained while kept at a maximum heat, the superfluous fat dropping back into the pan.

An embodiment of the invention is illustrated in the accompanying drawing, in which:—

Figure 1:
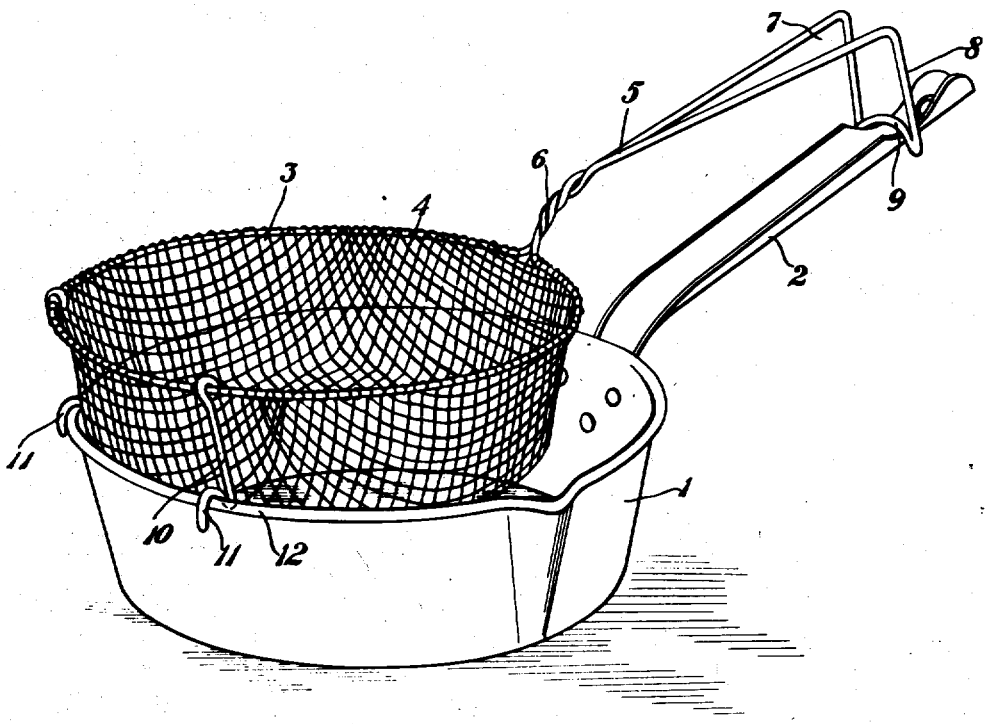
Figure 2:
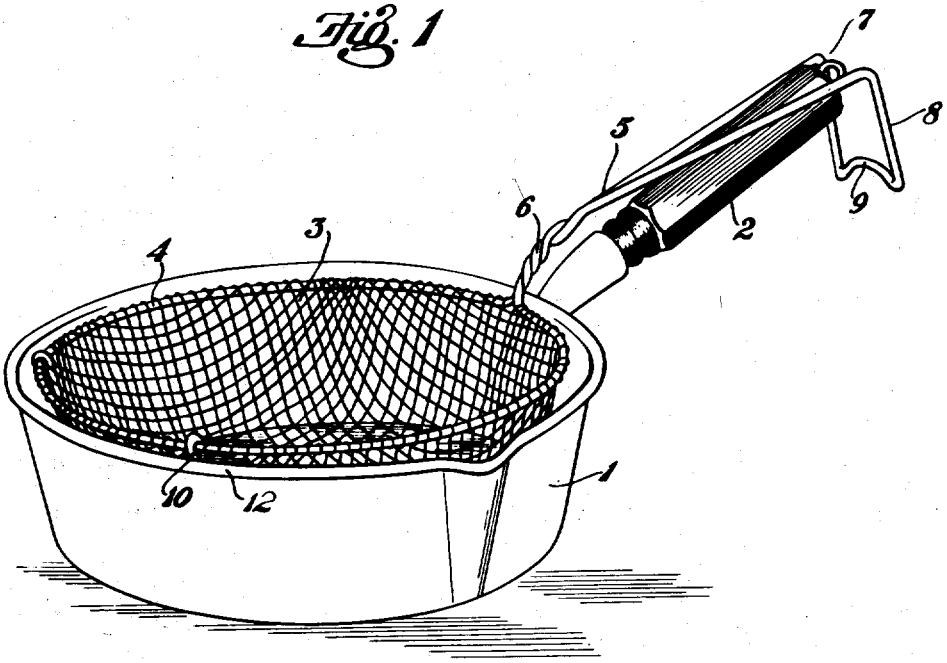

Figure 1 is a perspective view of the improved frying basket showing the same supported upon a stew pan for draining, and, Fig. 2, a similar view showing the basket in position within the stew pan.

Similar numerals of reference indicate corresponding parts throughout the drawing.

The stew pan 1 may be of any well known design, and provided with a handle 2 which may be metal, wood or any other usual construction. The improved frying basket 3, to which the invention pertains, is preferably formed of wire, and of a size to conveniently fit within the stew pan 1.

The rim of the wire frying basket may be reinforced by a heavier wire 4, from which may be also formed the wire handle 5, preferably twisted at 6, and extended away from the basket at an angle thereto, the outer end portion of this handle being open as at 7, and terminating in the down-turned foot portion 8, having the concaved lower end 9, arranged to be seated upon the handle 2 of the stew pan when the basket is in position for draining, as shown in Fig. 1.

Wire legs 10 are connected to the outside of the wire basket, opposite to the handle 5, said legs terminating at their lower ends in the curved feet 11 located substantially at the bottom of the wire basket and arranged to engage the rim lip 12 of the stew pan to drain the contents of the same, as shown in Fig. 1.

When it is desired to fry food in deep fat, the food is placed in the wire basket 3, which is then positioned within the stew pan 1, as shown in Fig. 2, the stew pan being of course filled to the desired depth with hot fat. It will be seen that with the basket in this position the handle 2 of the stew pan is received through the open down-turned foot portion 8 of the basket handle, thus locating the two handles together and in position to be grasped in one hand if it is necessary to move the utensil.

When the food has been properly cooked, it is necessary that all of the superfluous fat be drained from the same, and with the present utensil this is easily and readily accomplished by raising the basket out of the fat and placing the same over the stew pan, the feet 11 of the basket engaging the rim edge of the stew pan, and the down-turned foot 8 of the basket handle resting upon the handle of the stew pan. The basket is thus held out of the fat and the food is maintained at a maximum temperature while draining, all of the superfluous fat draining from the food back into the stew pan.

I claim:

1. In combination with a receptacle having a handle, a perforate basket arranged to fit within the receptacle, a handle upon the basket, and means upon the basket and basket handle for supporting the basket above the bottom of the receptacle upon the edge of the receptacle and the handle of the receptacle respectively.

2. In combination with a receptacle having a handle, a perforate basket arranged to fit within the receptacle, a handle upon the basket arranged to fit upon the handle of the receptacle, and means upon the basket and basket handle for engagement with the edge of the receptacle and the handle of the receptacle respectively, for supporting the basket above the bottom of the receptacle.

3. In combination with a receptacle having a handle, a perforate basket arranged to fit within the receptacle, a handle upon the basket having a down-turned foot portion arranged to fit over the receptacle handle and to rest upon the same, and members at the bottom portion of the basket arranged to rest upon the edge of the receptacle.

4. In combination with a receptacle having a handle, a perforate basket having a handle and members upon the basket and basket handle for engagement with the edge and handle respectively of the receptacle to support the basket above the bottom of the receptacle.

5. In combination with a stew pan and the like of usual construction, provided with a handle at one side, a perforate basket arranged to fit within the receptacle, a handle upon the basket arranged to lie adjacent to the handle of the pan when the basket is located within the pan, members on the lower portion of the basket opposite to the handle thereof for engagement with the edge of the pan, and the handle upon the basket being arranged to rest upon the handle of the pan for supporting the basket above the bottom of the pan.

6. In combination with a receptacle having a handle, a perforate basket arranged to fit within the receptacle, a handle upon the basket having a down-turned foot provided with a concave portion arranged to fit upon the receptacle handle and members at the bottom portion of the basket arranged to rest upon the edge of the receptacle, to support the basket above the bottom of the receptacle.

7. In combination with a stew pan and the like of usual construction, provided with a handle at one side, a perforate basket arranged to enter within the pan, a handle upon the basket, means on the lower portion of the basket opposite to the handle thereof for engagement with the edge of the pan and the handle of the basket being arranged to rest upon the handle of the pan for supporting the basket above the bottom of the pan.

8. In combination with a stew pan and the like of usual construction, provided with a handle at one side, a perforate basket arranged to enter within the pan, a handle upon the basket, means on the lower portion of the basket for engagement with the edge of the pan and the handle of the basket being arranged to rest upon the handle of the pan for supporting the basket above the bottom of the pan.

9. In combination with a stew pan and the like of usual construction, provided with a handle at one side, a perforate basket arranged to enter within the pan, a handle upon the basket, means on the lower portion of the basket for engaging the edge of the pan and the handles being arranged so that one will rest upon the other, for supporting the basket above the bottom of the pan.

10. A perforate basket having a handle for entering within a stew pan having a handle, there being means on the basket for engaging the rim of the pan and the handles being arranged for resting the one upon the other, for supporting the basket above the bottom of the pan.

CHARLES R. JAMISON.